(12) United States Patent
Ramsay et al.

(10) Patent No.: US 9,698,700 B2
(45) Date of Patent: Jul. 4, 2017

(54) PREDICTIVE CURRENT CONTROL IN BIDIRECTIONAL POWER CONVERTER

(71) Applicants: DRS Consolidated Controls, Inc., Bridgeport, CT (US); University of Connecticut, Farmington, CT (US)

(72) Inventors: Scott Ramsay, Oxford, CT (US); Michael Kelley, Hamden, CT (US); Matthew Tarca, Cheshire, CT (US); John Thompson, Oxford, CT (US); David Gellis, Bridgeport, CT (US); Thomas Parsons, Bridgeport, CT (US); Sung Yeul Park, Storrs, CT (US); Sungmin Park, Storrs, CT (US)

(73) Assignees: DRS Consolidated Controls, Inc., Bridgeport, CT (US); University of Connecticut, Farmington, CT (US)

( * ) Notice: Subject to any disclaimer, the term of this patent is extended or adjusted under 35 U.S.C. 154(b) by 111 days.

(21) Appl. No.: 14/645,355

(22) Filed: Mar. 11, 2015

(65) Prior Publication Data
US 2016/0268917 A1    Sep. 15, 2016

(51) Int. Cl.
*H02M 7/538*      (2007.01)
*H02M 5/458*      (2006.01)
(Continued)

(52) U.S. Cl.
CPC ............. *H02M 5/458* (2013.01); *B60L 1/00* (2013.01); *H02M 1/14* (2013.01); *H02M 1/42* (2013.01);
(Continued)

(58) Field of Classification Search
CPC ........... H02M 2001/007; H02M 5/293; H02M 2005/2932; H02M 7/5387; H02M 7/53871; H02M 7/53873; H02M 7/797
See application file for complete search history.

(56) References Cited

U.S. PATENT DOCUMENTS

| | | | |
|---|---|---|---|
| 3,742,336 A | 6/1973 | Bedford | |
| 4,555,755 A * | 11/1985 | Kurosawa | H02P 21/06 318/803 |

(Continued)

FOREIGN PATENT DOCUMENTS

| | | |
|---|---|---|
| CN | 102075109 A | 5/2011 |
| JP | 07-327374 A | 12/1995 |
| WO | WO 2014152948 A2 | 9/2014 |

OTHER PUBLICATIONS

Chen, J. et al., "Predictive Digital Current Programmed Control," *IEEE Transactions on Power Electronics*, vol. 18, No. 1 (Jan. 2003), pp. 411-419.

(Continued)

*Primary Examiner* — Matthew Nguyen
*Assistant Examiner* — Ishrat Jamali
(74) *Attorney, Agent, or Firm* — Kilpatrick Townsend & Stockton LLP

(57) ABSTRACT

A power converter can be controlled to generate a target output power. The control process may include obtaining a target current reference for the power converter, sensing an output current of the power converter, and determining a difference between the target current reference and the sensed output current. The next switching duty cycle for the next switching period of the switching circuits in the power converter can be derived based on at least the present switching duty cycle of the present switching period, and the difference between the target current reference and the sensed output current. The switching circuits of the power converter can then be switched according to the derived next switching duty cycle in the next switching period.

18 Claims, 8 Drawing Sheets

(51) Int. Cl.

| | |
|---|---|
| *H02M 7/5387* | (2007.01) |
| *H02M 5/293* | (2006.01) |
| *B60L 1/00* | (2006.01) |
| *H02M 1/14* | (2006.01) |
| *H02M 1/42* | (2007.01) |
| *H02M 7/79* | (2006.01) |
| *H02M 7/48* | (2007.01) |
| *H02M 1/00* | (2006.01) |

(52) U.S. Cl.
CPC ......... *H02M 5/293* (2013.01); *H02M 7/4807* (2013.01); *H02M 7/5387* (2013.01); *H02M 7/53871* (2013.01); *H02M 7/53873* (2013.01); *H02M 7/79* (2013.01); *H02M 2001/007* (2013.01); *Y02B 70/12* (2013.01)

(56) References Cited

U.S. PATENT DOCUMENTS

| | | | |
|---|---|---|---|
| 4,719,550 | A | 1/1988 | Gephart et al. |
| 6,021,052 | A | 2/2000 | Unger et al. |
| 6,507,503 | B2 | 1/2003 | Norrga |
| 7,275,622 | B2* | 10/2007 | Hall ................ B66B 5/02 187/277 |
| 7,558,087 | B2 | 7/2009 | Meysenc et al. |
| 7,690,456 | B2 | 4/2010 | Deng et al. |
| 7,889,524 | B2 | 2/2011 | Lee et al. |
| 2002/0176261 | A1 | 11/2002 | Norrga |
| 2004/0062059 | A1 | 4/2004 | Cheng et al. |
| 2006/0002157 | A1* | 1/2006 | Petter ................ H02J 3/38 363/37 |
| 2006/0062034 | A1 | 3/2006 | Mazumder et al. |
| 2007/0210766 | A1* | 9/2007 | Borowy ............. H02M 1/32 323/222 |
| 2008/0055938 | A1 | 3/2008 | Kajouke et al. |
| 2008/0111512 | A1 | 5/2008 | Theunissen et al. |
| 2008/0198637 | A1 | 8/2008 | Meysenc et al. |
| 2008/0238341 | A1* | 10/2008 | Korcharz ........... G09G 3/3413 315/297 |
| 2008/0298103 | A1 | 12/2008 | Bendre et al. |
| 2008/0304296 | A1 | 12/2008 | NadimpalliRaju et al. |
| 2009/0096082 | A1 | 4/2009 | Dutta |
| 2009/0196082 | A1 | 8/2009 | Mazumder et al. |
| 2010/0127652 | A1* | 5/2010 | Morita ............... H02P 27/08 318/400.27 |
| 2010/0236612 | A1* | 9/2010 | Khajehoddin ......... G05F 1/67 136/252 |
| 2012/0014140 | A1 | 1/2012 | Kajouke et al. |
| 2012/0163035 | A1 | 6/2012 | Song et al. |
| 2012/0170341 | A1 | 7/2012 | Fornage et al. |
| 2012/0206104 | A1 | 8/2012 | Tsuchiya |
| 2012/0307528 | A1* | 12/2012 | Humphrey ........... H02M 7/08 363/17 |
| 2013/0082636 | A1* | 4/2013 | Ohori ................ H02P 4/00 318/723 |
| 2014/0268959 | A1 | 9/2014 | Frohman et al. |
| 2014/0369087 | A1 | 12/2014 | Deng |
| 2016/0268916 | A1 | 9/2016 | Ramsay et al. |
| 2016/0268917 | A1 | 9/2016 | Ramsay et al. |

OTHER PUBLICATIONS

Liu, F., "Improved SMS islanding detection method for grid-connected converters," *IET Renewable Power Generation*, vol. 4, Iss. 1 (2010), pp. 36-42.

Yilmaz, M., and Krein, P. T., "Review of Charging Power Levels and Infrastructure for Plug-In Electric and Hybrid Vehicles and Commentary on Unidirectional Charging," [PowerPoint Presentation], 2012 IEEE International Electrical Vehicle Conference (IEVC'12), Mar. 7, 2012, South Carolina, USA, pp. 1-34.

International Search Report and Written Opinion mailed Jul. 15, 2014 in Int'l Patent Application No. PCT/US2014/028366, 9 pages.

U.S. Appl. No. 14/211,719 , "Non-Final Office Action", Feb. 24, 2016, 7 pages.

U.S. Appl. No. 14/211,719 , "Non-Final Office Action", Jul. 14, 2016, 7 pages.

U.S. Appl. No. 14/645,346, "Non-Final Office Action", Aug. 18, 2016, 13 pages.

U.S. Appl. No. 14/211,719 , "Notice of Allowance", Oct. 21, 2016, 8 pages.

U.S. Appl. No. 14/645,346 , "Notice of Allowance", Dec. 22, 2016, 7 pages.

* cited by examiner

PREDICTIVE CURRENT CONTROL IN BIDIRECTIONAL POWER CONVERTER

BACKGROUND

Vehicle-to-grid integration incorporates electric vehicles into the power system as energy storage units. In such applications, electric vehicles can be used to store excess energy from the grid when demand for power is low, and provide power back to the grid when demand for power is high. However, losses may occur during the energy conversion process. As such, it would be desirable to operate the vehicle's power converter in a manner that can achieve high power density while maintaining high efficiency.

Embodiments of the invention address these and other problems, individually and collectively.

BRIEF SUMMARY

Embodiments of the present invention provide a bidirectional power converter that can be used in an electric vehicle to perform AC to DC power conversion to charge the electric vehicle's battery, and to perform DC to AC power conversion to export power to an external load. In some embodiments, the bidirectional power converter may include an AC-AC converter (e.g., a cyclo-inverter), a DC-AC converter (e.g., a H-bridge converter) coupled to the AC-AC converter, and a DC-DC converter (e.g., a buck-boost circuit) coupled to the DC-AC converter. The power converter can be coupled to an electric vehicle battery, and can be operable to inject power into the power grid to act as a distributed power source when the vehicle is plugged in and connected to the power grid.

According to some embodiments, the power converter may include switching circuits operating according to a switching period, and a switch controller to control the switching circuits of the power converter. The switch controller may include a current reference generator and a predictive current controller. The current reference generator can be configured to generate a target current reference, which may include a current ripple compensation component. The predictive current controller can be configured to receive the target current reference from the current reference generator, and derive a next switching duty cycle for a next switching period based on at least a present switching duty cycle of the present switching period and a difference between the target current reference and an output current of the power converter. The derived next switching duty cycle can be applied to the switching circuits in the next switching period. In some embodiments, the next switching duty cycle is derived based on a dead time that is intentionally inserted into the switching period. During the dead time, switching circuits that are coupled on the same leg across a positive voltage source and a negative voltage source or ground are kept turned off to prevent forming a short circuit across the positive voltage source and the negative voltage source or ground (e.g., a transient short circuit may form due to switching delays as one switching circuit is being turned on as the other switching circuit on the same leg is being turned off). In some embodiments, the next switching duty cycle can be derived further based on a sum of a present output voltage of the power converter in the present switching period and a previous output voltage of the power converter in the previous switching period, and/or based on a leakage inductance of a transformer of the power converter.

In some embodiments, a power converter may include switching circuits switching according to a switching period, and a process for controlling the power converter to generate a target output power may include obtaining a target current reference for the power converter, sensing an output current of the power converter, and determining a difference between the target current reference and the sensed output current. The next switching duty cycle for the next switching period of the switching circuits in the power converter can be derived based on at least the present switching duty cycle of the present switching period, and the difference between the target current reference and the sensed output current. The switching circuits of the power converter can be switched according to the derived next switching duty cycle in the next switching period. In some embodiments, the process may include inserting a dead time in the switching period in which switching circuits on the same leg of the power converter are kept off, and the next switching duty cycle is derived further based on the dead time. In some embodiments, the next switching duty cycle can also be derived further based on a sum of a present output voltage of the power converter in the present switching period and a previous output voltage of the power converter in a previous switching period, and/or on a leakage inductance of a transformer of the power converter.

DETAILED DESCRIPTION

Embodiments of the present invention provide techniques for controlling a bidirectional power converter that can be used in an electric vehicle to perform AC to DC power conversion to charge the electric vehicle's battery and to perform DC to AC power conversion to export power to a power grid. The bidirectional power converter according to some embodiments can provide at least 15 kW of power in either conversion direction, and eliminates the need of bulk energy storage elements that are typically present between power stages of conventional high power converters. Bulk energy storage elements in conventional converters are typically sized in relation to line frequency. For typical line frequencies in the 60 Hz range, the bulk energy storage elements are typically large and expensive inductors and/or capacitors, making such bulk energy storage elements unsuitable for vehicle applications because of the material costs and physical size. For example, for a conventional 15 kW power converter, a 6000 uF bulk energy storage capacitor, which may have a physical size of about 12 inches by 8 inches by 4 inches, may be needed. Embodiments of the present invention eliminate the need for such bulk energy storage elements.

Figure 1:
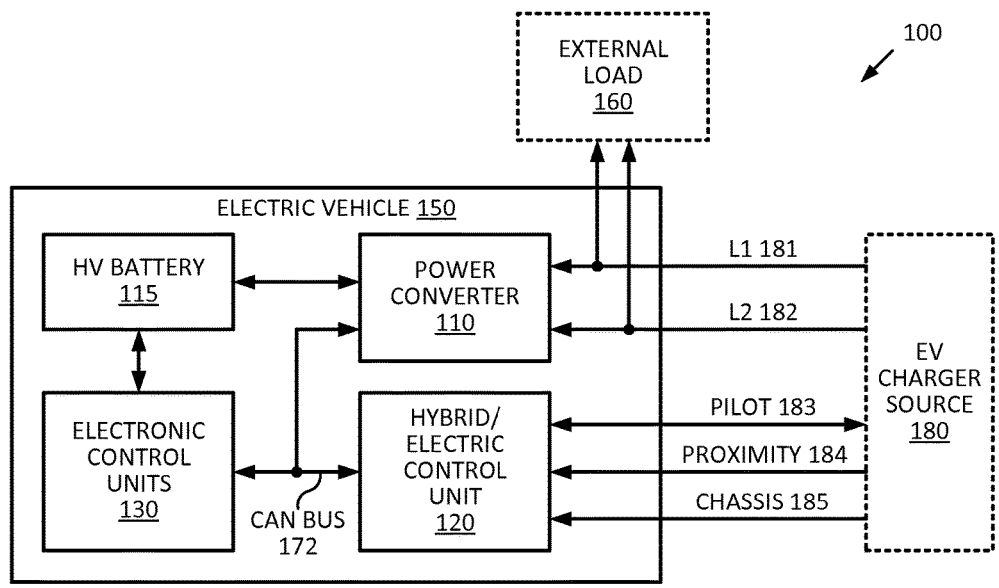
FIG. 1 illustrates a block diagram of an electric vehicle power system, according to some embodiments.

FIG. 1 illustrates a block diagram of an electric vehicle (EV) power system 100 according to some embodiments. Electric vehicle 150 includes a bidirectional power converter 110 coupled to a high voltage battery 115, one or more electronic control units 130, and a hybrid-electric control unit 120. Electric vehicle 150 can be a plug-in hybrid vehicle that powers its drivetrain using a combination of high voltage battery 115 and a combustion-based engine, a fuel cell hybrid vehicle that powers its drivetrain using a combination of high voltage battery 115 and a fuel cell, a plug-in electric vehicle that powers its drivetrain using only high voltage battery 115, or other types of electric vehicle that can power its drivetrain from high voltage battery 115.

High voltage battery 115 is a rechargeable battery that can provide sufficient energy to power a vehicle. High voltage battery 115 can delivery hundreds of volts (e.g., greater than 100 volts) as compared to standard car batteries that typically only deliver 12 or 24 volts. High voltage battery 115 may include any number of battery modules arranged in series or other topologies, and can be made of nickel metal hydride, lithium ion, cobalt dioxide, nickel-cobalt-manganese, nickel-cobalt-aluminum, manganese oxide, or other suitable materials that can be used to stored electrical energy to power a vehicle.

Electronic control units (ECU) 130 can include one or more vehicle control modules such as engine control module, powertrain control module, as well as other control modules to control a vehicle's systems such as the vehicle's transmission, braking system, power steering, etc. Hybrid-electric control unit 120 controls the vehicle's power delivery system such as switching between the use of high voltage battery 115 and an alternative power source (e.g., combustion engine, fuel-cell, etc.). Hybrid-electric control unit 120 can be communicatively coupled to ECU 130 through a vehicle's CAN bus (controller area network bus) to receive vehicle information such as driving conditions and driver input. Hybrid-electric control unit 120 is also communicatively coupled to high voltage battery 115 (e.g., directly, or via ECU 130 as shown, or through a vehicle's other communication systems), and can monitor the battery's performance and charge level to control charging of high voltage battery 115.

An external power source such as EV charger 180 can be used to charge high voltage battery 115. In some embodiments, EV charger 180 can be a SAE J1772 compliant charger and can provide two different charging levels, Level 1 and Level 2, to charge electric vehicle 150. EV charger 180 can provide a 120 Volt, single phase, 16 Amp peak current AC supply on the L1 181 terminal to provide Level 1 charging, or prove a 240 Volt, split phase, 80 Amp peak current AC supply on L2 182 terminal to provide Level 2 charging. EV charger 180 may also include control signals such as a control pilot signal 183 to communicate with hybrid-electric control unit 120 to coordinate charging level between high voltage battery 114 and EV charger 180, as well as a proximity detection signal 184 that can be used by electric vehicle 150 to detect the presence of and connectivity to EV charger 180. A chassis signal 185 can provide a common ground connection for the electric vehicle 150 and EV charger 180.

According to some embodiments, bidirectional power converter 110 can be coupled to high voltage battery 115, and can be operated in a charger mode to convert AC power from an external supply (e.g., power from EV charger 180) into DC power to charge high voltage battery 115, or an export mode to convert DC power from high voltage battery 115 to AC power for delivery to one or more external loads 160. The operating mode of bidirectional power converter 110 can be configured by ECU 130 (e.g., through CAN bus 172) or by hybrid-electric control unit 120. In some embodiments, the operating mode can be configured by bidirectional power converter 110 based on user input selecting the appropriate operating mode, or based on whether an external power source or an external load is connected to bidirectional power converter 110. For example, in some embodiments, an anti-islanding technique can be used by bidirectional power converter 110 to determine whether the power grid is connected, and the appropriate operating mode can be set based on detection of the presence of the power grid.

It should be understood that the term "external load" refers to a load that is external to bidirectional power converter 110, and not necessarily external to electric vehicle 150. In some embodiments, external load 160 can include an electrical system (e.g., an appliance, tools, equipment, etc.) that is configured to run on AC power and is external to electric vehicle 150 as shown in FIG. 1. Such an external load can be plugged into electric vehicle 150 to draw power from high voltage battery 115. In some embodiments, external load 160 can be the power grid, and the high voltage battery 115 can be used to compensate power to the grid during peak usage time. In other embodiments, the external load 160 can include an electrical system that is integrated as part of electric vehicle 150 (e.g., any electrical system of electric vehicle 150 that runs on AC power).

The input and output power levels and capabilities of bidirectional power converter 110 in either mode of operation can be adapted for use in different vehicles that may have different high voltage battery specifications and/or use different types of EV chargers (e.g., chargers in different countries that provide different power supplies). According to an exemplary embodiment of bidirectional power converter 110, in the charger mode of operation, bidirectional power converter 110 can receive an input AC voltage up to approximately 90-265 Volts and input AC currents of up to approximately 70 Amps at approximately 208-240 Volts, or up to approximately 16 Amps at approximately 120 Volts. Input line frequency in the range of approximately 47-63 Hz can be used, and a power factor of greater than 0.98 can be achieved. These exemplary input specifications are compatible with the Level 1 and Level 2 charging capabilities of SAE J1772 compliant chargers. In the exemplary embodiment, bidirectional power converter 110 can provide an output DC voltage up to approximately 450-750 Volts, and can provide an output current up to approximately 31 Amps at approximately 450 Volts average and 38 RMS, yielding an output power of approximately 14-15 kW. In some embodiments, the output DC voltage can be approximately 250-420 Volts.

According to an exemplary embodiment, bidirectional power converter 110 in the export mode of operation can receive an input DC voltage up to approximately 450-750 Volts and an input DC current up to approximately 36 Amps. The exemplary embodiment of bidirectional power converter 110 can provide continuous dual output AC currents up to approximately 60 Amps at approximately 120 Volts, or up to approximately 60 Amps at approximately 240 Volts with less than 3% sinusoidal wave distortion at approximately 60 Hz, yielding an output AC power of approximately 14-15 kW. The exemplary embodiment of bidirectional power converter 110 can also provide a neutral output rated at approximately 40 Amps, which can be used to compensate for unbalanced loads.

In either mode of operation, bidirectional power converter 110 can provide a power efficiency of greater than 90%, and can also provide 2500 Volts of input to ground and input to output voltage insulation, and short circuit and over temperature protection. It should be understood that the input and output specifications of bidirectional power converter 110 described above are illustrative and not restrictive, and that other embodiments of bidirectional power converter 110 can have other input and/or output specifications, tolerances, and/or capabilities.

Figure 2:
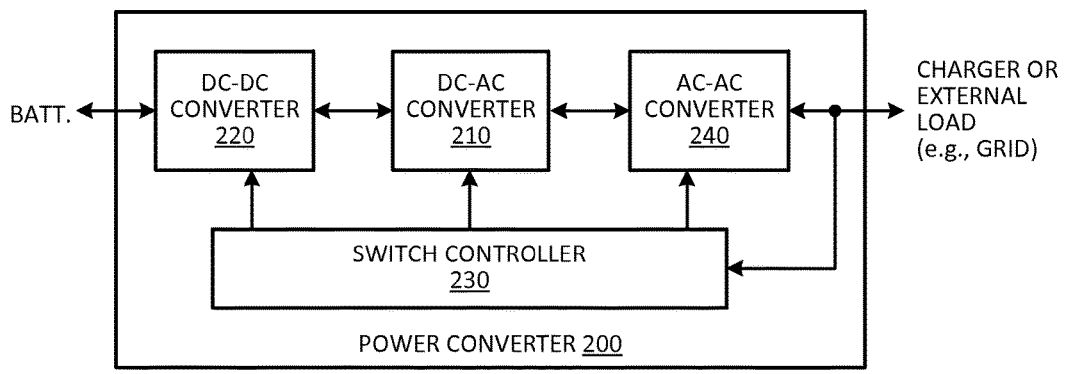
FIG. 2 illustrates a block diagram of a bidirectional power converter, according to some embodiments.

FIG. 2 illustrates a block diagram of a bidirectional power converter 200 according to some embodiments. Bidirectional power converter 200 includes a power path between a DC source or load such as high voltage battery 115, and an AC source or load such as EV charger 180 connected to a power grid. Bidirectional power converter 200 includes a DC-DC converter 220 coupled to the DC source, a DC-AC converter 210 (may also be referred to as a AC-DC converter due to its bidirectional capabilities) coupled to the DC-DC converter 220, and an AC-AC converter 240 coupled to the DC-AC converter 210. In some embodiments, DC-AC converter 210 can be implemented with a H-bridge inverter, AC-AC converter 240 can be implemented with a cyclo-inverter, and DC-DC converter 220 can be implemented as a buck-boost or neutral point clamp converter. Bidirectional power converter 200 can also include a switch controller 230 that is used to control the switching circuits in DC-DC converter 220, DC-AC converter 210, and AC-AC converter 240. Based on the input power characteristics and the desired output power characteristics in either direction, switch controller 230 can be programmed to control the various converters accordingly.

Switch controller 230 can be implemented using hardware, software, or a combination of, and can be implemented with one or more programmable logic devices (PLD) such as programmable logic array or array logic devices (PLAs/PALs), complex programmable logic devices (CPLDs), and/or field programmable gate array devices (FPGAs). In some embodiments, switch controller 230 can be implemented with one or more data processing devices such as one or more microprocessors or microcontrollers that are coupled to a memory storing computer readable code for performing the functionalities of switch controller 230.

A unique feature of bidirectional power converter 200 according to some embodiments is the ability to operate in either operating modes (charger mode, or export mode) without the need for a large DC bus capacitor. The elimination of a large bulk energy storage component significantly reduces size and cost of the system. However, in order to operate in charger mode while maintaining high power factor on the input AC power and without incorporating an overly complicated control algorithm, the ripple voltage on the intermediate DC bus between the converter stages must remain relatively low. To achieve this, the instantaneous output power on the DC terminals, according to some embodiments, can be maintained to be approximately equal to the instantaneous AC input power (e.g., within 1%, 2%, 5%, etc.). To actively control this power balance would typically require significant complexity and risk stability problems in conventional control systems. Embodiments of the present invention uses an improved control method that is simple to implement and easy to ensure stable operation.

Figure 3:
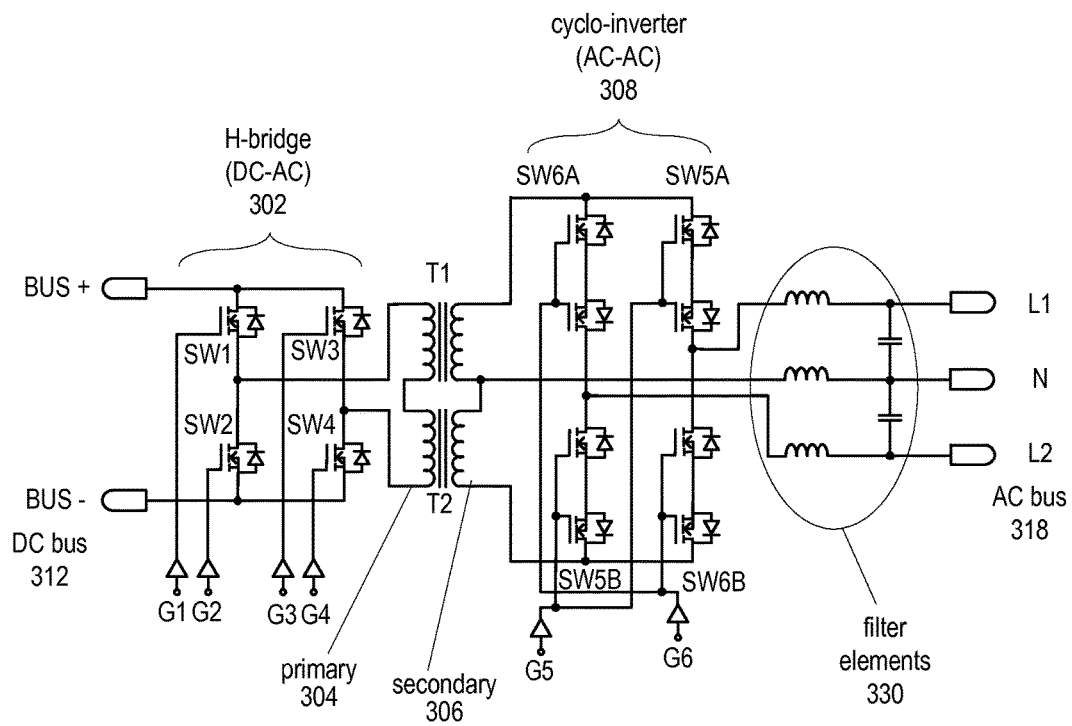
FIG. 3 illustrates a circuit diagram of a DC-AC converter coupled to a AC-AC converter, according to some embodiments.

FIG. 3 illustrates the DC-AC and AC-AC converter stages that can be used in bidirectional power converter 200 according to some embodiments of the invention. In FIG. 3, the DC-AC converter 210 is implemented with a H-bridge inverter 302 that is coupled to a DC bus 312 (from the DC-DC converter stage), and the AC-AC converter 240 is implemented with a cyclo-inverter 308 that is coupled to an AC bus 318 (e.g., from the power grid). H-bridge inverter 302 can be electrically coupled to cyclo-inverter 308 through a galvanic isolation such as one or more transformers. In some embodiments, two transformers T1 and T2 can be used as shown in FIG. 3, although a single transformer T1 can be used instead. The one or more inductive elements on the side of H-bridge inverter 302 are collectively referred to as the transformer primary 304, and the one or more inductive elements on the side of cyclo-inverter section 308 are collectively referred to as the transformer secondary 306. The transformer windings provided in transformer primary 304 and transformer secondary 308 can be the same to reduce transformer losses, although transformer primary 304 and transformer secondary 308 can have different number of transformer windings. In cases where H-bridge inverter 302 and cyclo-inverter section 308 share a common ground connection, the use of any transformers can be eliminated.

H-bridge inverter 302 includes switching circuits SW1, SW2 SW3, and SW4. Each or any of switching circuits SW1, SW2, SW3, and SW4 can be implemented using a transistor switch such as a FET (e.g., MOSFET, as shown), a BJT, a IGBT, or other suitable types of switching element. Each or any of switching circuits SW1, SW2 SW3, and SW4 may further include a diode coupled in parallel with the transistor switch. The diode can be arranged with the anode terminal of the diode towards the negative terminal of DC bus 312 and the cathode terminal of the diode towards the positive terminal of DC bus 312.

H-bridge inverter 302 has a first leg that includes switching circuits SW1 and SW2 coupled in series. A first terminal of switching circuit SW1 is coupled to the positive terminal of DC bus 312, and a second terminal of switching circuit SW2 is coupled to switching circuit SW2 and to a first terminal of transformer primary 304. Switching circuit SW1 is controlled by gate signal G1. A first terminal of switching circuit SW2 is coupled to switching circuit SW1 and to the first terminal of transformer primary 304, and a second terminal of switching circuit SW2 is coupled to the negative terminal of DC bus 312. Switching circuit SW2 is controlled by gate signal G2. The term "gate signal" and "switching signal" may be used interchangeably herein.

H-bridge inverter 302 also has a second leg that includes switching circuits SW3 and SW4 coupled in series. A first terminal of switching circuit SW3 is coupled to the positive terminal of DC bus 312, and a second terminal of switching circuit SW3 is coupled to switching circuit SW4 and to a second terminal of transformer primary 304. Switching circuit SW3 is controlled by gate signal G3. A first terminal of switching circuit SW4 is coupled to switching circuit SW3 and to the second terminal of transformer primary 304, and a second terminal of switching circuit SW4 is coupled to the negative terminal of DC bus 312. Switching circuit SW4 is controlled by gate signal G4.

Cyclo-inverter 308 includes switching circuits SW5A, SW5B, SW6A, and SW6B. Each or any of switching circuits SW5A, SW5B, SW6A, and SW6B includes two switches coupled in series. Each or any of the switches can be implemented as a transistor switch such as a FET (e.g., a MOSFET, as shown), a BJT, a IGBT, or other suitable types of switching element. Each or any of the switches may further include a diode coupled in parallel with the transistor switch. In each of switching circuits SW5A, SW5B, SW6A, and SW6B, the diodes can be arranged such that the anode terminals of the respective diodes of the two switches are coupled together at an internal connection node, and the cathode terminals of the respective diodes of the two switches are arranged in opposing directions.

Cyclo-inverter section 308 has a first leg that includes switching circuits SW5A and SW6B coupled in series. A first terminal of switching circuit SW5A is coupled to a first terminal of the transformer secondary 306, and a second terminal of switching circuit SW5A is coupled to switching circuit SW6B and to a first line terminal L1 of AC bus 318. Switching circuit SW5A is controlled by gate signal G5. A first terminal of switching circuit SW6B is coupled to switching circuit SW5A and to the first line terminal L1 of AC bus 318, and a second terminal of switching circuit SW6B is coupled to a second terminal of transformer secondary 306. Switching circuit SW6B is controlled by gate signal G6.

Cyclo-inverter section 308 also has a second leg that includes switching circuits SW6A and SW5B coupled in series. A first terminal of switching circuit SW6A is coupled to the first terminal of the transformer secondary 306, and a second terminal of switching circuit SW6A is coupled to switching circuit SW5B and to the second line terminal L2 of AC bus 318. Switching circuit SW6A is controlled by gate signal G6. A first terminal of switching circuit SW5B is coupled to switching circuit SW6A and to the second line terminal L2 of AC bus 318, and a second terminal of switching circuit SW5B is coupled to a second terminal of transformer secondary 306. Switching circuit SW5B is controlled by gate signal G5.

In some embodiments, cyclo-inverter section 308 can operate with a single phase AC bus 318, and may provide a neutral terminal N of AC bus 318 that is coupled to the transformer secondary 306. In the embodiment as shown which includes two transformers T1 and T2, the neutral terminal N of AC bus 318 can be coupled to the node connecting the respective inductive elements of T1 and T2 on the transformer secondary 306. In embodiments in which a single transformer is used, the neutral terminal N of AC bus 318 can be coupled to the second terminal of the transformer secondary 306. One or more terminals of AC bus 318 (L1, L2, or N) can also include a filtering inductor coupled in-line with the respective terminal. AC bus 318 may also include a filtering capacitor coupled between L1 and N, and between L2 and N, as shown. In some embodiments, cyclo-inverter section 308 can also be adapted to operate with a three phase AC bus 318.

Figure 4:
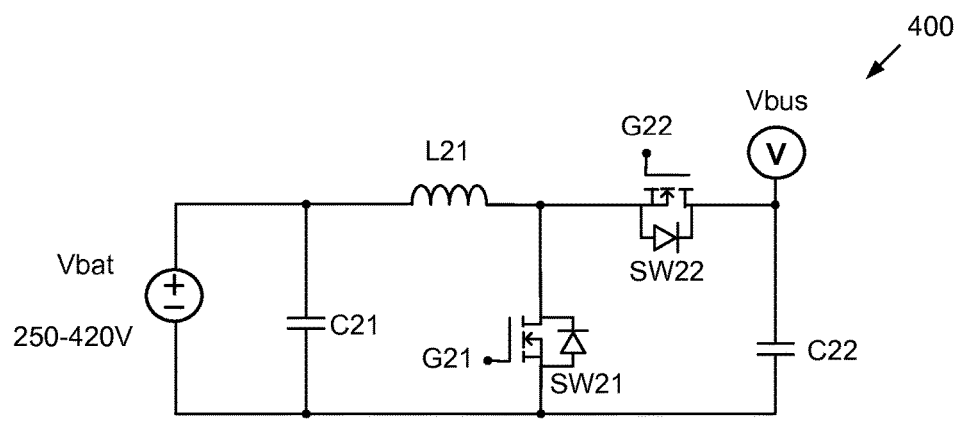
FIG. 4 illustrates a circuit diagram of a DC-DC converter, according to some embodiments.

FIG. 4 illustrates a DC-DC converter 400 that can be used in bidirectional power converter 200 according to some embodiments. As shown, DC-DC converter 400 is implemented as a buck-boost converter, and the Vbus of DC-DC converter 400 can be coupled to the DC bus 312 of DC-AC converter 302. In some embodiments, DC-DC converter 400 can operate with a battery voltage from 250 V to 420 V and a Vbus voltage from 400 V to 440 V depending on the amplitude of the battery voltage.

DC-DC converter 400 includes two switching circuits SW21 and SW22, an optional filtering capacitor C21, an inductor L21, and an output capacitor C22. Each or any of switching circuits SW21 and SW22, can be implemented using a transistor switch such as a FET (e.g., MOSFET, as shown), a BJT, a IGBT, or other suitable types of switching element. Each or any of switching circuits SW21 and SW22 further includes a diode coupled in parallel with the transistor switch. Filtering capacitor C21 is coupled in parallel with the battery. It should be understood that although filtering capacitor C21 is coupled in parallel with the battery, filtering capacitor C21 is not a bulk energy storage element, but is instead used as a filter to reduce switching ripples on the power signal. For example, filtering capacitor C21 may have a capacitance in the range of about 20-30 uF, whereas bulk energy storage capacitors for similar power levels of embodiments of the bidirectional power converter can be in the range of 5000 uF or more.

Switching circuit SW21 is coupled in parallel with filtering capacitor C21 and output capacitor C22. Inductor L21 is in series with the battery, and has a first terminal coupled to the positive terminal of the battery and filtering capacitor C21, and a second terminal coupled to switching circuit SW21 and switching circuit SW22. Switching circuit SW22 is coupled in series with inductor L21, and has a first terminal coupled to inductor L21 and switching circuit SW21, and a second terminal coupled to output capacitor C22.

Switching circuit SW21 is controlled by gate signal G21, and switching circuit SW22 is controlled by gate signal G22. In the boost mode of operation, switching circuit SW22 is opened, and switching circuit SW21 is switched on and off to control the amount of current supplied through inductor L21 to output capacitor C22 to boost the $V_{bus}$ voltage. In the buck mode of operation, switching circuit SW22 and switching circuit SW21 are alternately switched on and off to control the amount of current provided to $V_{bus}$ to limit the $V_{bus}$ voltage. Gate signals G21 and G22 can be controlled by a switch controller such as switch controller 230 or 1830.

Additional details on the operation of the DC-DC, DC-AC, and AC-AC converter stages and their respective gate signals for switching their corresponding switching circuits are described in U.S. patent application Ser. No. 14/211,719 entitled "Bidirectional Power Converter" filed on Mar. 14, 2014 (assigned to the same assignee as the present application, and published as U.S. Patent Publication No. 2014/0268959-A1), which is incorporated by reference herein in its entirety for all purposes.

Figure 5:
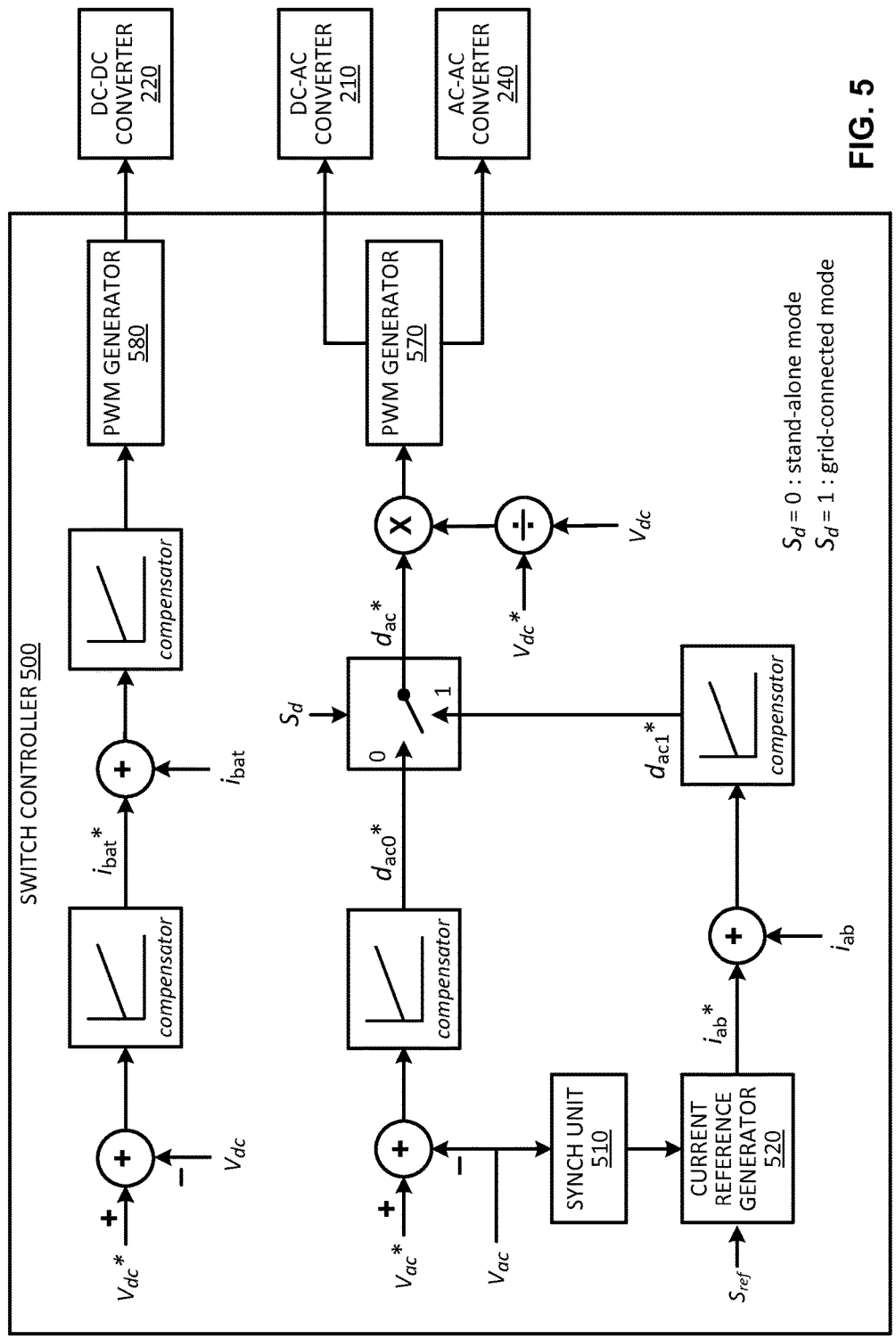
FIG. 5 illustrates a block diagram of a switch controller, according to some embodiments.

FIG. 5 illustrates a functional block diagram of a switch controller 500, according to some embodiments. Switch controller 500 generates the gate signals for operating the switching circuits in the DC-DC converter 220 (e.g., buck-boost converter 400), DC-AC converter 210 (e.g., H-bridge inverter 302), and AC-AC converter 240 (e.g., cyclo-inverter 308). The functionalities of the switch controller 500 can be separated into controls for generating the gate signals for the DC-DC converter 220, and controls for generating the gate signals for the DC-AC converter 210 and AC-AC converter 240.

For the DC-DC converter 220, switch controller 500 can monitor the DC bus voltage $V_{dc}$, and determine the difference between the DC bus voltage $V_{dc}$ and the target DC voltage $V_{dc}^*$. Based on this difference, a compensator (e.g., a PI controller) can be used to set a target battery current reference $i_{bat}^*$ to bring the DC bus voltage $V_{dc}$ to the target DC voltage $V_{dc}^*$. The target battery current reference $i_{bat}^*$ can be compared with the battery current $i_{bat}$, and a compensator (e.g., a PI controller) can determine, based on the difference in the target battery current reference $i_{bat}^*$ and the battery current $i_{bat}$, the appropriate duty cycle of the gate signals to operate the DC-DC converter 220 at the target voltage. A pulse width modulation (PWM) generator 580 then generates the gate signals for the DC-DC converter 220 with the proper timing and the determined duty cycle. Control of the DC-DC converter 220 based on the DC bus voltage can be used for both when the bidirectional power converter is operating in stand-alone mode (e.g., when the bidirectional power converter is disconnected from the power grid), and when the bidirectional power converter is operating in grid-connected mode (e.g., when the bidirectional power converter is plugged in and coupled to the power grid).

For the DC-AC converter 210 and AC-AC converter 240, the duty cycles of the gate signals may be controlled differently, depending on whether the bidirectional power converter is operating in stand-alone mode or grid-connected mode. In stand-alone mode, control of the DC-AC converter 210 and AC-AC converter 240 is performed based on AC bus voltage. Switch controller 500 may monitor the AC bus voltage $V_{ac}$, and determine the difference between the AC bus voltage $V_{ac}$ and the target AC voltage $V_{ac}^*$. Based on this difference, a compensator (e.g., a PI controller) may be used to determine the appropriate switching duty cycle $d_{ac0}^*$ to operate the DC-AC converter 210 and AC-AC converter 240 to bring the AC bus voltage $V_{ac}$ to the target AC voltage $V_{ac}^*$ in stand-alone mode.

In grid-connected mode (e.g., for injecting power into the power grid, or to charge the vehicle battery using energy from the power grid), control of the DC-AC converter 210 and AC-AC converter 240 is performed based on the output power. In order to maintain a high power factor and high efficiency when the bidirectional converter is plugged in and coupled to a time-varying power signal on the AC bus such as a grid voltage signal from the power grid, the output power of the bidirectional power converter is synchronized to the time-varying power signal on the AC bus. As such, the AC bus voltage $V_{ac}$ is monitored by a synchronization unit 510 to determine the state (e.g., phase) of the time-varying power signal. The state of the time-varying power signal is then provided to a current reference generator 520 that determines a target current reference $i_{ab}^*$ for the AC bus based on the state of the time-varying power signal and the target output power $S_{ref}$. The target reference current $i_{ab}^*$ for the AC bus can be compared with the current $i_{ab}$ on the AC bus, and a compensator (e.g., a PI controller) can determine, based on the difference in the target current reference $i_{ab}^*$ and the current $i_{ab}$ on the AC bus, the appropriate duty cycle $d_{ac1}^*$ to operate the DC-AC converter 210 and AC-AC converter 240 in grid-connected mode.

When the bidirectional power converter is operating in stand-alone mode, the duty cycle $d_{ac0}^*$ is selected as the switching duty cycle $d_{ac}$ for the DC-AC converter 210 and AC-AC converter 240. When the bidirectional power converter is operating in grid-connected mode, the duty cycle $d_{ac1}^*$ is selected as the switching duty cycle $d_{ac}$. The selected switching duty cycle $d_{ac}$ is then provided to PWM generator 570 to generate the gate signals for the DC-AC converter 210 and AC-AC converter 240 with the proper timing and selected duty cycle. In some embodiments, the selected duty cycle $d_{ac}$ can further be tuned to compensate for any mismatch between the DC bus voltage $V_{dc}$ to the target DC voltage $V_{dc}^*$.

Figure 6:
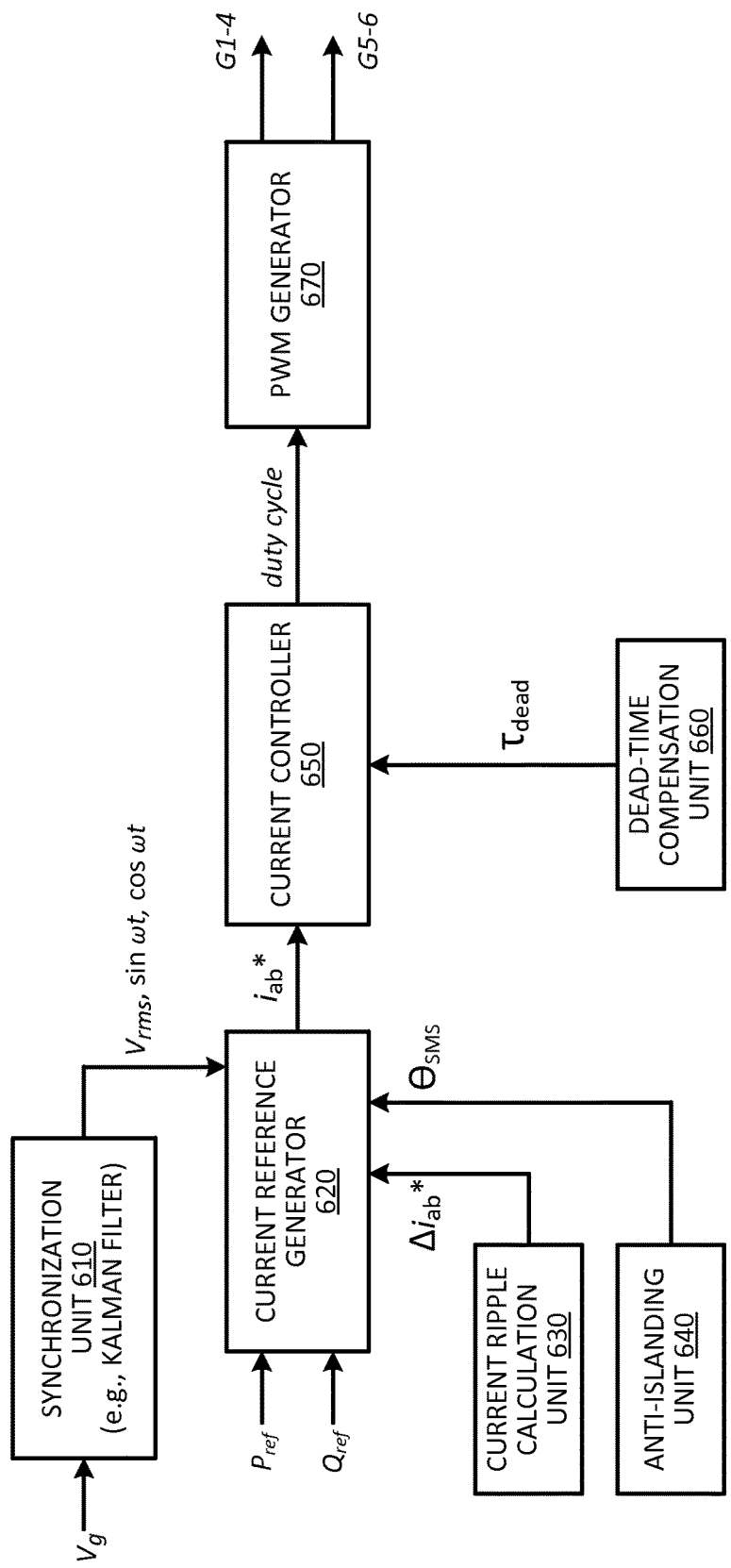
FIG. 6 illustrates a block diagram of an example implementation of a switch controller, according to some embodiments.

FIG. 6 illustrates example components of a switch controller used to generate the gate signals for the DC-AC converter 210 (e.g., gate signals G1-G4 for H-bridge inverter 302) and AC-AC converter 240 (e.g., gate signals G5-G6 for cyclo-inverter 308) in grid-connected mode, according to some embodiments. The switch controller may include a synchronization unit 610, a reference current generator 620, a ripple current calculation unit 630, an anti-islanding unit 640, a current controller 650, a dead-time compensation unit 660, and a pulse-width modulation (PWM) generator 670.

Synchronization unit 610 synchronizes the operation of the bidirectional power converter to a time-varying power signal on the AC bus (e.g., power grid voltage signal $V_g$ from a power grid). Synchronization unit 610 can be used in both charging mode and export mode when the bidirectional power converter is plugged in and connected to the power grid to maintain a high power factor and high efficiency. Synchronization unit 610 monitors the time-varying power signal on the AC bus to derive state of the time-varying power signal such that an appropriate target current reference for the bidirectional power converter can be set.

In some embodiments, synchronization unit 510 can be implemented using a Kalman filter as shown to track the time-varying power signal (e.g., power grid voltage signal $V_g$) on the AC bus. Due to variations of the electrical loads drawing power from the power grid and/or other environmental disturbances, perturbations such as harmonics, voltage imbalance, noise, frequency deviations, and transients may be present on the time-varying power signal, causing the time-varying power signal to deviate away from an ideal sinusoidal wave. Because the timing and duty cycles of the gate signals are controlled based in part on the state of the time-varying power signal, using a distorted time-varying power signal as a reference may result in a reduction in power factor and a loss of efficiency. By using a Kalman filter to track the time-varying power signal, perturbations on the time-varying power signal can be identified and compensated or filtered out such that the bidirectional power converter can maintain a high power factor despite noise and distortions on the time-varying power signal.

The Kalman filter may sample the time-varying power signal, and track various state variables of the time-varying power signal. Given a known frequency of the time-varying power signal to track (e.g., 60 Hz fundamental line frequency), a Kalman filter can be designed with the appropriate coefficients to provide an estimation of the fundamental signal from a series of noisy or distorted samples. Examples of state variables used in the Kalman filter may include the sine and cosine components of the time-vary power signal as a function of the angular frequency, and the RMS voltage of the time-vary power signal, etc. The filtered sine and cosine components, sin ωt and c cos ωt, and the RMS voltage $V_{rms}$ representing the state of the time-vary power signal are then provided to the current reference generator 620 for the calculation of an appropriate target current reference $i_{ab}^*$. In some embodiments, additional characteristics of the time-varying power signal that the Kalman filter tracks and filters may include other characteristics such as the DC bias voltage, current, harmonic components (e.g., $3^{rd}$ and $5^{th}$ harmonics, etc.).

In some embodiments, instead of using a Kalman filter, synchronization unit 610 can be implemented using a phase-lock-loop (PLL) that estimates the instantaneous phase of the time-vary power signal. Example of PLLs that can be used may include power-based PLL, enhanced PLL, and inverse Park-based PLL, etc. However, such PLL implementations may be more susceptible to dynamic disturbances and/or harmonics on the power signal.

Current reference generator 620 derives the target current reference $i_{ab}^*$ for the AC bus of the bidirectional power converter based on the state of the time-varying power signal and the target output power. In embodiments in which synchronization unit 610 is implemented with a Kalman filter, because the Kalman filter generates the filtered sine and cosine components of the time-varying power signal to represent the state of the power signal, the target current reference calculation uses a combination of sine and cosine terms instead of phase information.

The target current reference calculation expressed as a combination of the sine and cosine components is given by:

$$i_{ab}^* = k_1 \sin \omega t + k_2 \cos \omega t \quad (1).$$

Thus, in some embodiments, current reference generator 620 can be configured to apply the sine coefficient $k_1$ to the filtered sine component of the time-varying power signal $\sin \omega t$ received from the synchronization unit 610 to derive a current reference sine component ($k_1 \sin \omega t$), and to apply the cosine coefficient $k_2$ to the filtered cosine component of the time-varying power signal $\cos \omega t$ received from the synchronization unit 610 to derive a current reference sine component ($k_2 \cos \omega t$). The target current reference $i_{ab}^*$ for the bidirectional power converter can be set to include a sum of the current reference sine component and current reference cosine component according to equation (1).

The sine coefficient $k_1$ and cosine coefficient $k_2$ can be derived as follows, according to some embodiments. The target current reference calculation using phase information can be expressed as:

$$i_{ab}^* = \left(I_{ref\_mag} - \frac{\Delta i_{ab}^*}{2}\right)\sin(\theta - \theta_{reactive} + \theta_{sms}). \quad (2)$$

where $i_{ab}^*$ is the target reference current, $I_{ref\_mag}$ is the current magnitude, $\Delta i_{ab}^*$ is the current ripple compensation due to trailing edge modulation, $\theta$ is the phase of the time-vary voltage signal (e.g., phase of grid voltage $V_g$), $\theta_{reactive}$ is the reactive power phase shift, and $\theta_{sms}$ is the anti-islanding phase disturbance.

The target output power reference expressed in terms of the active power reference $P_{ref}$ and reactive power reference $Q_{ref}$ is given by:

$$S_{ref} = \sqrt{P_{ref}^2 + Q_{ref}^2} \quad (3).$$

Thus, $I_{ref\_mag}$ can be expressed as:

$$I_{ref\_mag} = \frac{\sqrt{2} \cdot S_{ref}}{V_{grms}}. \quad (4)$$

where $V_{grms}$ is the RMS voltage of the time-varying power signal (e.g., grid voltage signal), and $\theta_{reactive}$ can be expressed as:

$$\theta_{reactive} = \cos^{-1}\left(\frac{P_{ref}}{S_{ref}}\right). \quad (5)$$

Referring back to equation (2), using trigonometric identity, the term $\sin(\theta - \theta_{reactive} + \theta_{sms})$ can be expressed as follows:

$$\sin(\theta - \theta_{reactive} + \theta_{sms}) = \quad (6)$$
$$\sin(\theta - \theta_{reactive})\cos\theta_{sms} + \cos(\theta - \theta_{reactive})\sin\theta_{sms} =$$
$$(\sin\theta\cos\theta_{reactive} - \cos\theta\sin\theta_{reactive})\cos\theta_{sms} +$$
$$(\cos\theta\cos\theta_{reactive} - \sin\theta\sin\theta_{reactive})\sin\theta_{sms}.$$

Substituting equations (4), (5), and (6) into equation (2) yields:

$$i_{ab}^* = \left(I_{ref\_mag} - \frac{\Delta i_{ab}^*}{2}\right) \cdot ((\sin\theta\cos\theta_{reactive} - \cos\theta\sin\theta_{reactive})\cos\theta_{sms} + \quad (7)$$
$$(\cos\theta\cos\theta_{reactive} - \sin\theta\sin\theta_{reactive})\sin\theta_{sms}) =$$
$$\left(\frac{\sqrt{2} \cdot S_{ref}}{V_{grms}} - \frac{\Delta i_{ab}^*}{2}\right)\left(\left(\frac{P_{ref}}{S_{ref}}\sin\theta - \frac{Q_{ref}}{S_{ref}}\cos\theta\right)\cos\theta_{sms} + \right.$$
$$\left(\frac{P_{ref}}{S_{ref}}\cos\theta - \frac{Q_{ref}}{S_{ref}}\sin\theta\right)\sin\theta_{sms}\right) =$$
$$\left(\frac{\sqrt{2} \cdot S_{ref}}{V_{grms}} - \frac{\Delta i_{ab}^*}{2}\right)\left(\left(\frac{P_{ref}\cos\theta_{sms} + Q_{ref}\sin\theta_{sms}}{S_{ref}}\right)\sin\theta - \right.$$
$$\left.\left(\frac{Q_{ref}\cos\theta_{sms} - P_{ref}\sin\theta_{sms}}{S_{ref}}\right)\cos\theta\right).$$

Comparing equation (7) with equation (1), the sine coefficient $k_1$ can be obtained as:

$$k_1 = \left(\frac{\sqrt{2} \cdot S_{ref}}{V_{grms}} - \frac{\Delta i_{ab}^*}{2}\right)\left(\frac{P_{ref}\cos\theta_{sms} + Q_{ref}\sin\theta_{sms}}{S_{ref}}\right), \quad (8)$$

and the cosine coefficient $k_2$ can be expressed as:

$$k_2 = \left(\frac{\sqrt{2} \cdot S_{ref}}{V_{grms}} - \frac{\Delta i_{ab}^*}{2}\right)\left(\frac{Q_{ref}\cos\theta_{sms} - P_{ref}\sin\theta_{sms}}{S_{ref}}\right). \quad (9)$$

In some embodiments, if the current ripple compensation $\Delta i_{ab}^*$ is ignored, or if the sensing point to the current is configured to detect the average current such that the current ripples are averaged out, then the current ripple $\Delta_{ab}^*$ can be removed from the sine and cosine coefficient calculations. Removing the current ripple compensation $\Delta i_{ab}^*$ in equations (8) and (9) simplifies the sine and cosine coefficient calculations as follows:

$$k_1 = \left(\frac{\sqrt{2}}{V_{grms}}\right)(P_{ref}\cos\theta_{sms} + Q_{ref}\sin\theta_{sms}), \quad (10)$$

$$k_2 = \left(\frac{\sqrt{2}}{V_{grms}}\right)(Q_{ref}\cos\theta_{sms} - P_{ref}\sin\theta_{sms}). \quad (11)$$

In some embodiments, the sine and cosine coefficients calculations can be further simplified if the anti-islanding phase disturbance is assumed to be small such that $\cos \theta_{sms} \approx 1$ and $\cos \theta_{sms} \approx \theta_{sms}$. Assuming the anti-islanding phase disturbance to be small, equations (10) and (11) becomes:

$$k_1 = \left(\frac{\sqrt{2}}{V_{grms}}\right)(P_{ref} + Q_{ref}\sin\theta_{sms}), \qquad (12)$$

$$k_2 = \left(\frac{\sqrt{2}}{V_{grms}}\right)(Q_{ref} - P_{ref}\sin\theta_{sms}). \qquad (13)$$

The anti-islanding phase disturbance $\theta_{sms}$ is a phase disturbance injected into the system to detect an unintentional islanding condition. An islanding condition occurs when a part of a distributed utility system becomes isolated from the rest of the system (i.e. forming an island) and continues to operate to supply power to a location. For example, an islanding condition may occur if the energy from the power grid is interrupted, but the grid-connected vehicle continues to energize a load on the grid. When an islanding condition occurs unintentionally, continuing to power a load on the grid from the distributed source may create a hazard for utility workers or for the public by causing a line to remain energized when the line is assumed to have been disconnected from all energy sources. Furthermore, when an island is formed and isolated, the utility may have no control over the current, voltage, and/or frequency in the island, creating the possibility of damaging electrical equipment in the island. As such, anti-islanding mechanism can be used in the bidirectional power converter to detect the occurrence of unintentional islanding and take the appropriate action (e.g., discontinue exporting power).

One example of an anti-islanding mechanism that can be implemented by the bidirectional power converter to detect an islanding condition is a slip-mode frequency shift process. In a slip-mode frequency shift process, the phase angle of the output current is controlled with respect to the frequency of the PCC (point of common coupling) voltage. For example, if the frequency of the PCC voltage is slightly increased after the grid disconnection, the phase angle of the current is increased, which reduces the time to the next zero crossing of the PCC voltage. This is interpreted by the controller as a frequency increase, so the phase angle of the current is increased again, and so on, until the over-frequency protection is triggered. Similarly, when the frequency of the PCC voltage decreases after the grid disconnection, the frequency is continuously decreased until the under-frequency protection is triggered. Other anti-islanding mechanisms that can be used by the bidirectional power convert may include an active frequency drift process, in which a current distortion is injected into the current reference to detect unintentional islanding when the current distortion causes a frequency drift.

Figure 7:
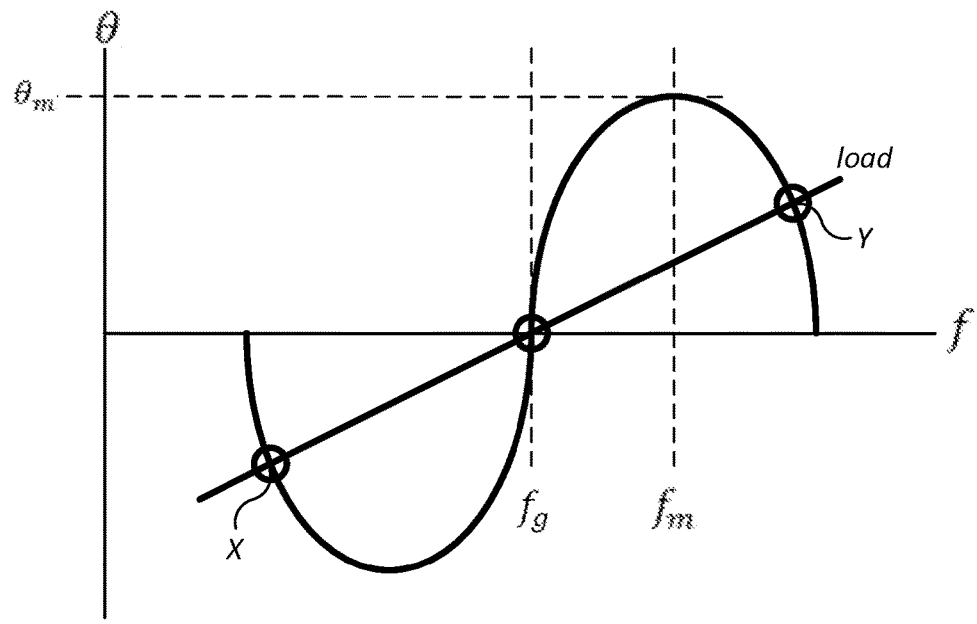
FIG. 7 illustrates a phase-response curve of a slip-mode frequency shift process, according to some embodiments.

FIG. 7 shows an example of a phase response curve of a bidirectional power converter that employs a slip-mode frequency shift anti-islanding mechanism, according to some embodiments. The phase-frequency operating point of a load (e.g., a RLC load) will settle at an intersection of the load line and inverter phase response curve. In the region near the grid line frequency $f_g$, the phase response of the converter increases/decreases faster than the phase of the load. While the grid is connected, the grid's power signal provides a solid phase and frequency reference to stabilize the operating point at the line frequency $f_g$. However, if an island is formed and the grid power signal is interrupted, if a small frequency perturbation occurs at the PCC to push the frequency away from the line frequency $f_g$, the S-shaped phase response curve of the power converter causes the phase error to increase in magnitude. This provides a positive feedback mechanism to reinforce the perturbation and drive the system to a new operating point at either point X or Y, depending on the direction of the perturbation. By setting the under-frequency protection trigger at a frequency before reaching point X, and the over-frequency protection trigger at a frequency before reaching point Y, the power converter can be configured to shut down when an unintentional islanding condition is detected.

Referring to FIG. 7, the anti-islanding phase disturbance $\theta_{sms}$ attributed to the anti-islanding mechanism can be expressed as:

$$\theta_{sms} = \frac{2\pi}{360}\theta_m \sin\left(\frac{\pi}{2}\frac{f - f_g}{f_m - f_g}\right), \qquad (14)$$

where $\theta_m$ is the maximum phase shift, $f_m$ is the frequency at the maximum phase shift, and f is the output frequency of the power converter. To provide a more accurate target current reference for the power converter, current reference generator 620 can take into account the anti-islanding phase disturbance $\theta_{sms}$ when calculating the target current reference, as indicated by the current reference equations discussed above.

Figure 8:
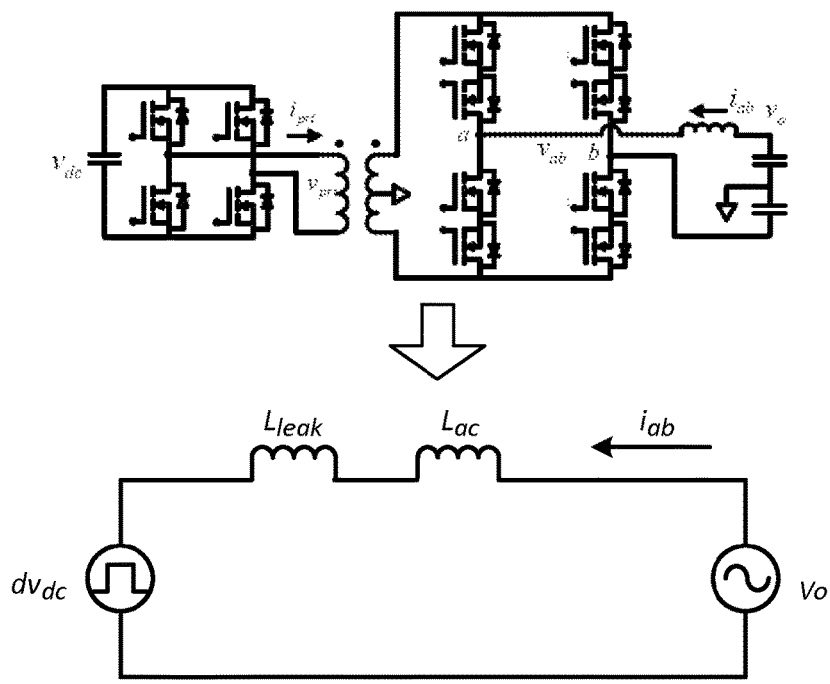
FIG. 8 illustrates a simplified model of a power converter, according to some embodiments.

In some embodiments, the current reference generator 620 may also compensate for current ripple $\Delta i_{ab}^*$ when deriving the sine and cosine coefficients for the target current reference calculation (e.g., according to equations (8) and (9)). The topology of coupling a H-bridge inverter with a cyclo-inverter reduces the amount of current ripple on the AC bus as compared to conventional converters with similar inductance values. In some embodiments, the AC current ripple may have a frequency two times that of the switching frequency, which allows a reduction in the size of the AC output filter. Referring to FIG. 8, assuming the switching actions and the high frequency transformer are ideal (e.g., without delays or distortions), the H-bridge and cyclo-inverter topology can be represented as a simplified average model operating at twice the switching frequency, as shown. The simplified model includes a leakage inductance of the transformer $L_{leak}$ in series with the converter inductance $L_{ac}$, which are coupled between the instantaneous H-bridge inverter DC voltage $v_{dc}$ switching with a duty cycle d and the AC bus voltage $v_o$ (e.g., coupled to grid voltage $V_g$). Based on this model, the current ripple $\Delta i_{ab}^*$ at the current peak point can be calculated according to:

$$\Delta i_{ab}^* = \left(\frac{1}{2}\frac{T_s\sqrt{2}\,v_{orms}}{v_{dc}}\right)\frac{ABS(\sqrt{2}\,v_{orms} - v_{dc})}{L_{leak} + L_{ac}}, \qquad (15)$$

where $T_s$ is the switching period, $v_{orms}$ is the root-mean-square voltage of the AC bus, and $v_{dc}$ is the instantaneous DC voltage at the H-bridge inverter. A current ripple calculation unit 630 can be configured to calculate the current ripple according to equation (15), and provide the current ripple value to the current reference generator 620. In embodiments in which the current ripple is ignored, current ripple calculation unit 630 can be omitted.

Referring back to FIG. 6, the target current reference $i_{ab}^*$ determined by the current reference generator 620 is provided to current controller 650 to derive the duty cycle of the gate signals for the switching circuits of the DC-AC converter 210 and AC-AC converter 240. In some embodiments, current controller 650 can be implemented using a predictive current controller, where in one switching period, the duty cycle for the next switching cycle is calculated based on the sensed or observed state and input/output information, such that the error of the controlled variable is cancelled out or minimized in the next cycle or in the next several cycles.

Using the simplified average model of FIG. 8, the AC bus voltage $v_o$ (e.g., coupled to grid voltage $V_g$) can be expressed as:

$$v_o = (L_{leak} + L_{ac})\frac{di_{ab}}{dt} + dv_{dc}. \tag{16}$$

Figure 9:
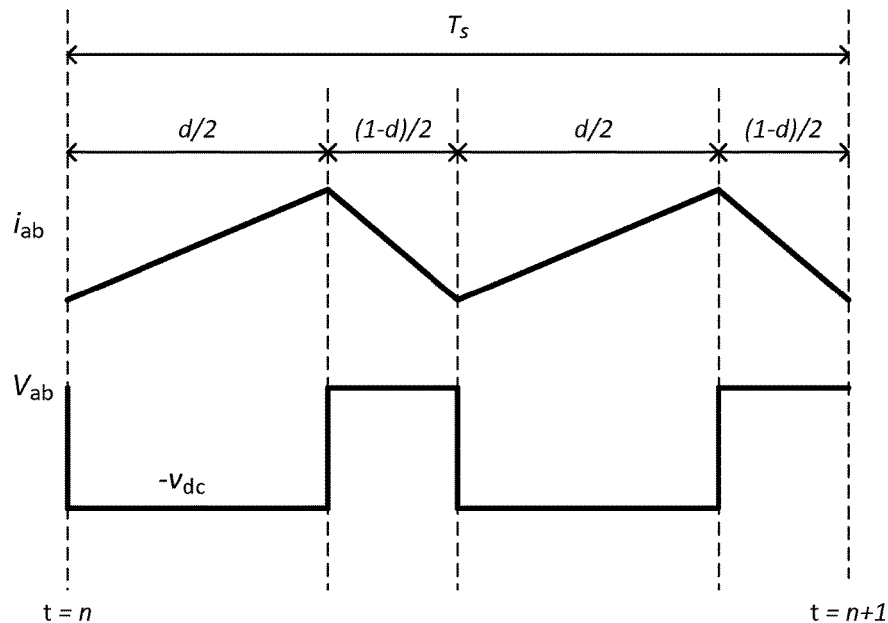
FIG. 9 illustrates a waveform for calculating a switching duty cycle using a predictive current control process, according to some embodiments.

Referring to the switching waveform shown in FIG. 9, the AC bus voltage at time n is then given by:

$$v_o(n) = (L_{leak} + L_{ac})\frac{i_{ab}(n) - i_{ab}(n-1)}{T_s} + d(n)v_{dc}. \tag{17}$$

Rearranging equation (17) yields the current at time n as:

$$i(n) = i(n-1) + \frac{T_s(v_o(n-1) - d(n)v_{dc})}{L_{leak} + L_{ac}}. \tag{18}$$

The current at time n+1 can then be expressed as:

$$i(n+1) = i(n) + \frac{T_s(v_o(n) - d(n+1)v_{dc})}{L_{leak} + L_{ac}}. \tag{19}$$

Adding equations (18) and (19) yields:

$$i(n+1) = i(n-1) + \frac{T_s(v_o(n-1) - d(n)v_{dc} + v_o(n) - d(n+1)v_{dc})}{L_{leak} + L_{ac}}. \tag{20}$$

Rearranging equation (20) in terms of the duty cycle in the next switching period d(n+1), and substituting $i(n+1)=i_{ab}^*$ and $i(n-1)=i_{ab}$, the predicted duty cycle for the next switching period d(n+1) can be obtained as:

$$d(n+1) = \frac{v_o(n) + v_o(n-1)}{v_{dc}} - d(n) - \frac{L_{leak} + L_{ac}}{v_{dc}T_s}(i_{ab}^*(n) - i_{ab}(n)). \tag{21}$$

To improve tracking of the target current reference by the predictive current controller, a dead-time compensation unit 660 can be used to provide a dead time compensation factor to the predictive current controller to compensate for a dead time that is intentionally inserted into the switching cycle. In some embodiments, a dead time can be inserted into the switching duty cycle of the H-bridge inverter 302 to ensure that switching circuits on the same leg (e.g., SW1 and SW2, SW3 and SW4, etc.) are not on at the same time to avoid short circuit current caused by the turn on/off delays of the switching circuits. In order to compensate for this dead time inserted into the switching cycle, equation (17) becomes:

$$v_o(n) = (L_{leak} + L_{ac})\frac{i_{ab}(n) - i_{ab}(n-1)}{T_s} + d(n)v_{dc}\tau_{dead}, \tag{22}$$

where $\tau_{dead}$ is the dead time compensation factor determined by:

$$\tau_{dead} = (T_s - 2T_{dead})/T_s \tag{23},$$

when the sign of $v_o$ is different than the sign of $i_{ab}$, and $$\tau_{dead} = (T_s + 2T_{dead})/T_s \tag{24},$$

when the signs of $v_o$ and $i_{ab}$ are the same, where $T_s$ is the switching period and $T_{dead}$ is the dead time inserted into the switching cycle. In some embodiments, $T_{dead}$ can be in the order of 0.4 to 0.6 µs. Based on equation (22), the calculation for the predicted duty cycle of the next switching period d(n+1) performed by the predictive current controller can be modified as:

$$d(n+1) = \frac{v_o(n) + v_o(n-1)}{v_{dc}\tau_{dead}} - d(n) - \frac{L_{leak} + L_{ac}}{v_{dc}\tau_{dead}T_s}(i_{ab}^*(n) - i_{ab}(n)). \tag{25}$$

Figure 10:
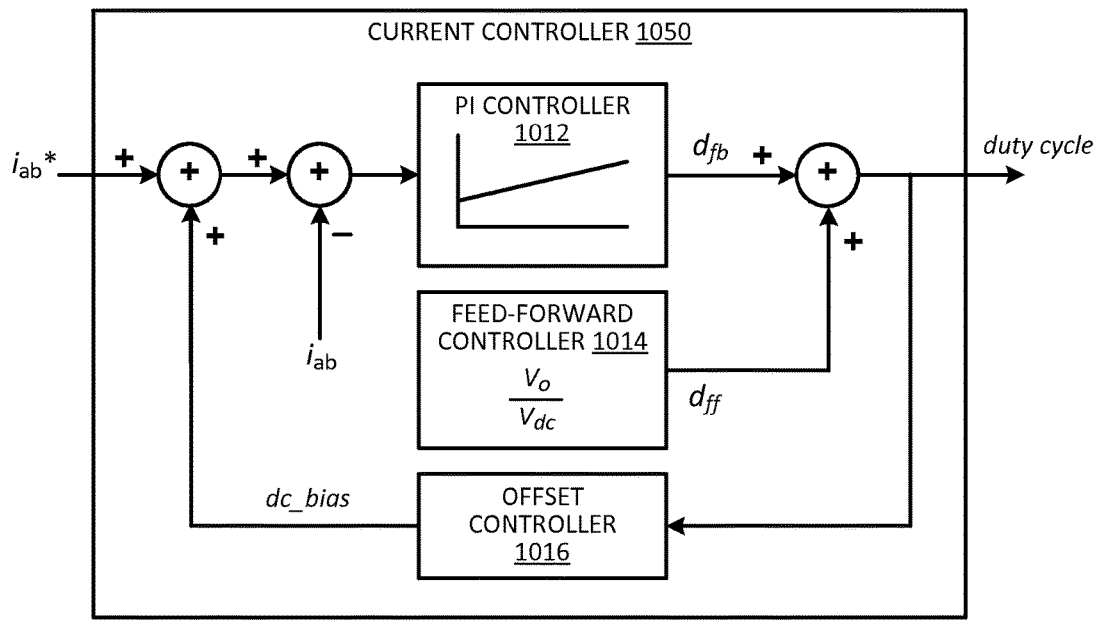
FIG. 10 illustrates a block diagram of an example implementation of a current controller, according to some embodiments.

In some embodiments, instead of using a predictive current controller as described above to derive the duty cycle of the gate signals provided to the switching circuits, a PI controller implementation can be used. FIG. 10 illustrates a current controller 1050 that is implemented using a PI controller, according to some embodiments. Current controller 1050 includes a PI controller 1012, a feed-forward controller 1014, and an offset controller 1016. PI controller 1012 can monitor the difference between the target current reference and the sensed output current, and use the feedback control to apply a proportional term $K_P$ and an integral term $K_I/S$ to the current difference to determine the duty cycle to move the output current towards the target current reference. The PI controller can be designed based on the simplified average model shown in FIG. 8 for the continuous time domain, and converted to a discrete time domain for implementation on a digital controller.

In some embodiments, a feed-forward controller 1014 can be used to supplement the feedback control of PI controller 1012 to compensate for undesired input admittances. Referring back to equation (16), rearranging the equation for the duty cycle d yields:

$$d = -\frac{1}{v_{dc}}(L_{leak} + L_{ac})\frac{di_{ab}}{dt} + \frac{v_o}{v_{dc}}, \tag{26}$$

where the first term $$\left(\frac{1}{v_{dc}}(L_{leak} + L_{ac})\frac{di_{ab}}{dt}\right)$$

corresponds to a feedback duty cycle component $d_{fb}$ attributed to the feedback control (e.g., from PI controller 1012), and the second term ($v_o/v_{dc}$) corresponds to a feed-forward duty cycle component $d_{ff}$ attributed to feed-forward control (e.g., from feed-forward controller 1014). In some embodiments, the operational signs of the feedback and feed-forward duty cycle terms can be reversed to yield:

$$d = \frac{1}{v_{dc}}(L_{leak} + L_{ac})\frac{di_{ab}}{dt} - \frac{v_o}{v_{dc}}, \tag{27}$$

such that the PI controller 1012 can use a positive gain value. Current controller 1050 may also include an offset controller 1016 to calculate an averaged DC-bias to increase or decrease the DC offset on the target current reference to provide a balanced output duty cycle. In some embodiments, the DC-bias can be averaged over 1 second intervals.

Referring back to FIG. 6, the duty cycle from current controller 650 (implemented using either a predictive current controller or PI controller) is provided to PWM generator 670 to generate the gate signals with the derived switching duty cycle for the DC-AC converter 210 (e.g., gate signals G1-G4 for H-bridge inverter 302) and AC-AC converter 240 (e.g., gate signals G5-G6 for cyclo-inverter 308). In some embodiments, PWM generator 670 synchronizes the switching activity on gate signals G5 and G6 for cyclo-inverter 308 with gate signals G1 and G2 in the H-bridge inverter 302, and phase shifts the gate signals G3 and G4 in the H-bridge inverter 302 relative to G1 and G2 to control the output AC voltage. Additional details on the operation of the gate signals are described in U.S. patent application Ser. No. 14/211,719 entitled "Bidirectional Power Converter" filed on Mar. 14, 2014 (assigned to the same assignee as the present application, and published as U.S. Patent Publication No. 2014/0268959-A1).

Figure 11:
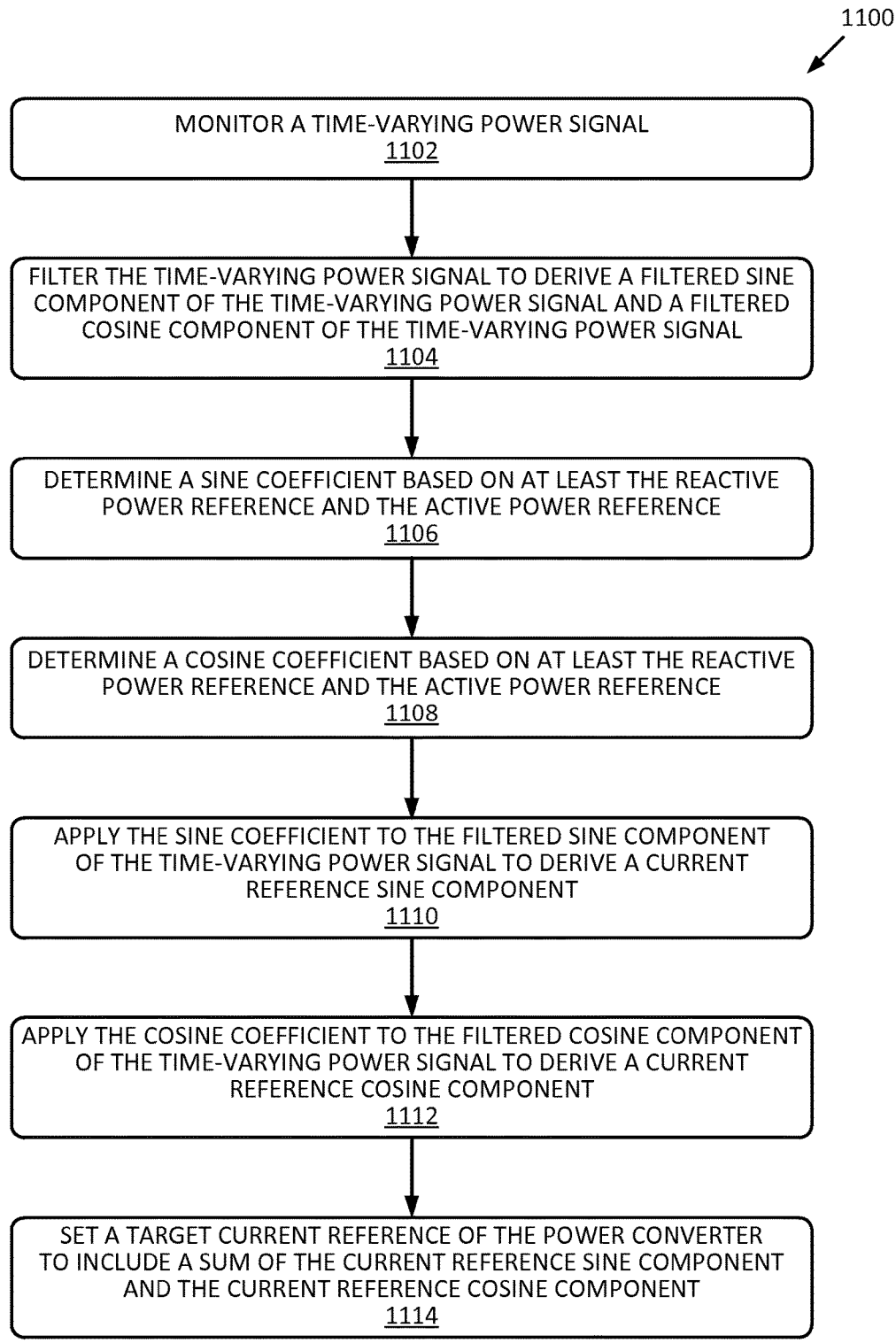
FIG. 11 illustrates a process for controlling a power converter to derive a target current reference, according to some embodiments.

FIG. 11 illustrates a flow diagram of a process 1100 for controlling a power converter to generate a target output power based on a reactive power reference and an active power reference, according to some embodiments. More specifically, process 1100 can be used to derive the target current reference $i_{ab}^*$ that the power converter is set to in order to synchronize the output power with a time-varying power signal such as a grid voltage signal from a power grid. In some embodiments, some or all of process 1100 can be performed by a synchronization unit (e.g., synchronization unit 610) coupled to a current reference generator (e.g., synchronization unit 620).

At block 1102, a time-vary power signal such as a grid voltage signal from the power grid coupled to the AC bus of the power converter is monitored and tracked. At block 1104, the time-varying power signal is filtered to remove disturbances on the time-varying power signal to derive the state of the fundamental time-varying power signal. In some embodiments, a Kalman filter can be used to filter the time-varying power signal to derive a filtered sine component of the time-varying power signal (sin ωt) and a filtered cosine component of the time-vary power signal (cos ωt) as functions of angular frequency ω. In some embodiments, a PLL with a loop filter can be used to derive phase information of the time-varying power signal.

At block 1106, the sine coefficient $k_1$ of the target current reference is determined based on at least the reactive power reference $Q_{ref}$ and the active power reference $P_{ref}$ of the target output power, and further based on the anti-islanding disturbance $\theta_{sms}$ injected into the system to detect unintentional islanding condition. At block 1108, the cosine coefficient $k_2$ of the target current reference is determined based on at least the reactive power reference $Q_{ref}$ and the active power reference $P_{ref}$ of the target output power, and further based on the anti-islanding disturbance $\theta_{sms}$. The unintentional islanding detection mechanism that injects the anti-islanding disturbance can be, for example, a slip-mode frequency shift process. In some embodiments, an active frequency drift process can alternatively be used as the unintentional islanding detection mechanism.

According to some embodiments, the sine coefficient $k_1$ and the cosine coefficient $k_2$ can be determined using equations (8) and (9), respectively, as described above, if the current ripple compensation $\Delta i_{ab}^*$ is considered in the sine and cosine coefficient determinations. In some embodiments, the sine coefficient $k_1$ and the cosine coefficient $k_2$ can be determined using equations (10) and (11), respectively, if the current ripple compensation $\Delta i_{ab}^*$ is ignored. To further simplify the calculations, if the anti-islanding disturbance $\theta_{sms}$ is assumed to be small, equations (12) and (13) can be used.

At block 1110, the sine coefficient $k_1$ derived from block 1106 is applied to the filtered sine component sin ωt of the time-varying power signal to derive a current reference sine component $k_1$ sin ωt. At block 1112, the cosine coefficient $k_2$ derived from block 1108 is applied to the filtered cosine component cos ωt of the time-varying power signal to derive a current reference cosine component $k_2$ cos ωt. At block 1114, the target current reference $i_{ab}^*$ of the power converter can be set to include a sum of the current reference sine component $k_1$ sin ωt and the current reference cosine component $k_2$ cos ωt, for example, using equation (1), as described above. The target current reference $i_{ab}^*$ is then used by either a predictive current controller or a PI controller to derive the appropriate duty cycle for the switching gate signals to synchronize the output power of the power converter to the time-varying power signal (e.g., grid voltage signal) coupled to the AC bus of the power converter.

Figure 12:
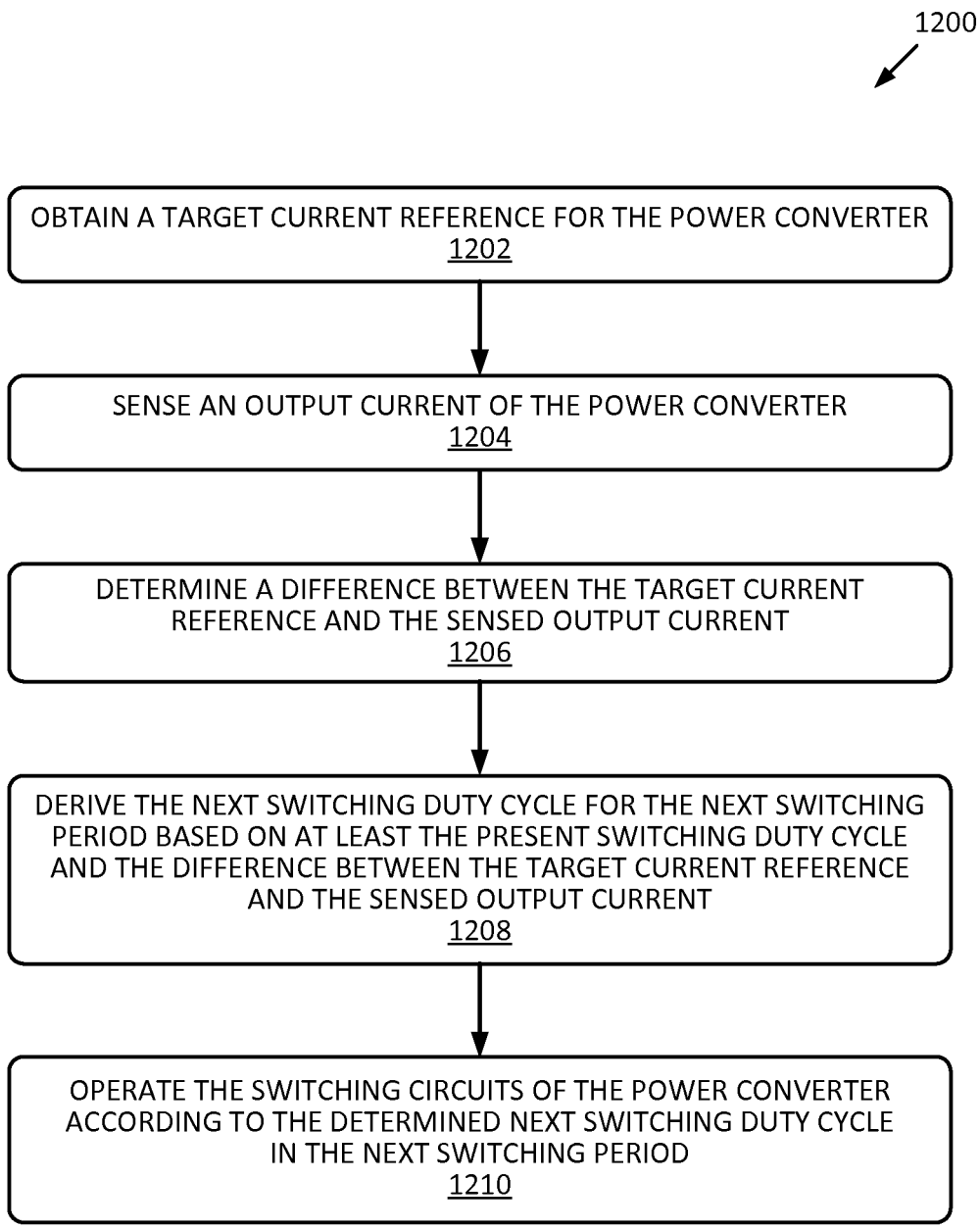
FIG. 12 illustrates another process for controlling a power converter to derive a switching duty cycle, according to some embodiments.

FIG. 12 illustrates a flow diagram of a process 1200 for controlling a power converter that includes switching circuits that are switching according to a switching period to generate a target output power, according to some embodiments. More specifically, process 1200 can be used to derive the next switching duty cycle of the next switching period of the gate signals provided to the switching circuits to synchronize the output power with a time-varying power signal such as a grid voltage signal from a power grid. In some embodiments, some or all of process 1200 can be performed by a current controller (e.g., current controller 650) implemented with a predictive current controller.

At block 1202, a target current reference $i_{ab}^*$ for the power converter is obtained, for example, from a current reference generator implementing process 1100. In some embodiments, the target current reference $i_{ab}^*$ may include a current ripple compensation $\Delta i_{ab}^*$ to compensate for current ripples from trailing edge modulation. At block 1204, the output current $i_{ab}$ of the power converter is sensed or monitored, and at block 1206, the difference between the target current reference $i_{ab}^*$ and the actual output current $i_{ab}$ is determined.

At block 1208, the next switching duty cycle d(n+1) of the gate signals for the switching circuits in the next switching period is derived based on at least the present switching duty cycle d(n), and the difference between the target current reference $i_{ab}^*$ and the actual output current $i_{ab}$. In some embodiments, the next switching duty cycle d(n+1) can be derived using equation (21) described above. Thus, the next switching duty cycle d(n+1) may be derived further based on, for example, a sum of a present output voltage $v_o(n)$ of the power converter in the present switching period and a previous output voltage $v_o(n-1)$ of the power converter in a previous switching period, the leakage inductance $L_{leak}$ of the transformer of the power converter, the inductance $L_{ac}$ of the power converter, and the switching period $T_s$, etc.

In some embodiments, if the power converter inserts a dead time $T_{dead}$ in the switching period in which the switching circuits on the same leg of the power converter are kept turned off to prevent a short circuit current due to the switching delays of the switching circuits, the next switching duty cycle d(n+1) can be derived further based on this dead time. For example, the next switching duty cycle can be derived using equation (25) described above to include a dead time compensation factor $\tau_{dead}$, which is computed based on, for example, equations (23) and (24).

At block 1210, in the next switching period, the switching circuits of the power converter are switched or operated according to the derived next switching duty cycle d(n+1). In some embodiments, a PWM generator can be used to generate the gate signals provided to the switching circuits of the power converter based on the derived next switching duty cycle d(n+1).

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), flash memory, solid-state memory, a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a," "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

All patents, patent applications, publications, and descriptions mentioned above are herein incorporated by reference in their entirety for all purposes. None is admitted to be prior art.

What is claimed is:

1. A method for controlling a power converter that includes a plurality of switching circuits switching according to a switching period to generate a target output power, the method comprising:
   obtaining a target current reference for the power converter;
   sensing an output current of the power converter;
   determining a difference between the target current reference and the sensed output current;
   deriving a next switching duty cycle for a next switching period based on at least a present switching duty cycle of the present switching period, and the difference between the target current reference and the sensed output current, wherein the next switching duty cycle is derived further based on a sum of a present output voltage of the power converter in the present switching period and a previous output voltage of the power converter in a previous switching period; and
   switching the plurality of switching circuits of the power converter according to the derived next switching duty cycle in the next switching period.

2. The method of claim 1, further comprising:
   inserting a dead time in the switching period in which switching circuits on a same leg of the power converter are kept off.

3. The method of claim 2, wherein the next switching duty cycle is derived further based on the dead time.

4. The method of claim 1, wherein the next switching duty cycle is derived further based on a leakage inductance of a transformer of the power converter.

5. The method of claim 1, wherein the target current reference includes a current ripple compensation component.

6. The method of claim 1, wherein the power converter is operable to inject power into a power grid.

7. The method of claim 1, wherein the power converter is part of an electric vehicle.

8. A power converter comprising:
   a plurality of switching circuits operating according to a switching period; and
   a switch controller including:
   a current reference generator configured to generate a target current reference; and
   a predictive current controller configured to receive the target current reference from the current reference generator, and derive a next switching duty cycle for a next switching period based on at least a present switching duty cycle of the present switching period and a difference between the target current reference and an output current of the power converter, wherein the next switching duty cycle is derived further based on a sum of a present output voltage of the power converter in the present switching period and a previous output voltage of the power converter in a previous switching period, and wherein the derived next switching duty cycle is applied to the plurality of switching circuits in the next switching period.

9. The power converter of claim 8, wherein a dead time is inserted into the switching period.

10. The power converter of claim 9, wherein the next switching duty cycle is derived further based on the dead time.

11. The power converter of claim 8, wherein the next switching duty cycle is derived further based on a leakage inductance of a transformer of the power converter.

12. The power converter of claim 8, wherein the target current reference includes a current ripple compensation component.

13. The power converter of claim 8, wherein the power converter includes an AC-AC converter coupled to a DC-AC converter.

14. The power converter of claim 13, wherein the AC-AC converter includes a cyclo-inverter.

15. The power converter of claim 13, wherein the DC-DC converter includes a H-bridge inverter.

16. The power converter of claim 8, further comprising a DC-DC converter coupled to the DC-AC converter.

17. The power converter of claim 16, wherein the DC-DC converter includes a buck-boost circuit.

18. The power converter of claim 8, wherein the power converter is coupled to an electric vehicle battery.

* * * * *